May 21, 1968  F. D. WERNER  3,383,916
PRESSURE INSTRUMENTATION DEVICE
Filed July 22, 1964  3 Sheets-Sheet 1
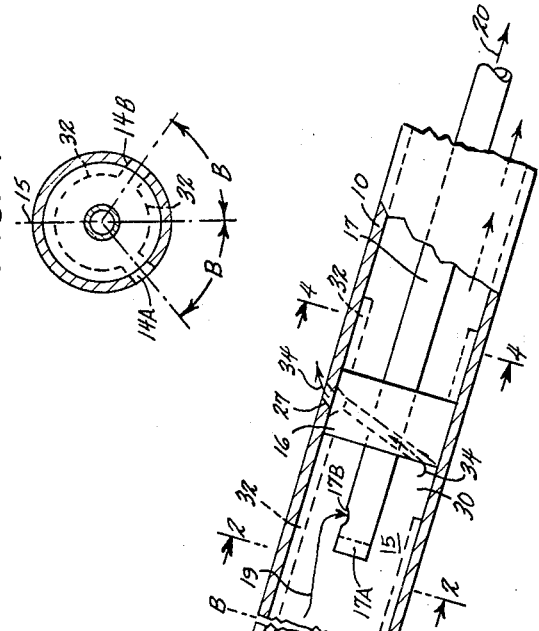
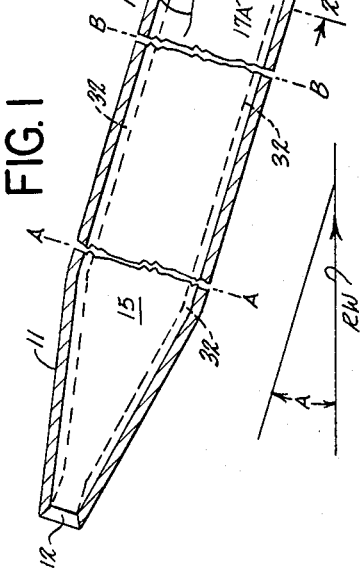
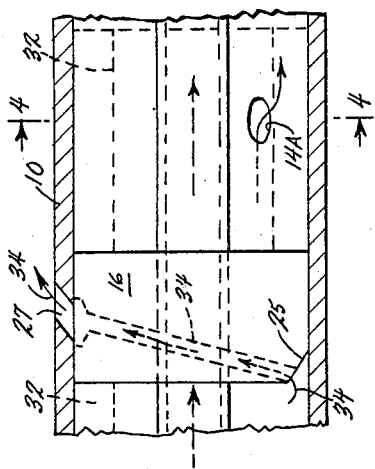
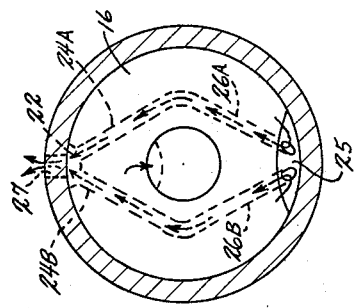
INVENTOR.
FRANK D. WERNER
BY
Dugger, Braddock, Johnson & Westman
ATTORNEYS May 21, 1968
F. D. WERNER
3,383,916
PRESSURE INSTRUMENTATION DEVICE
Filed July 22, 1964
3 Sheets-Sheet 2
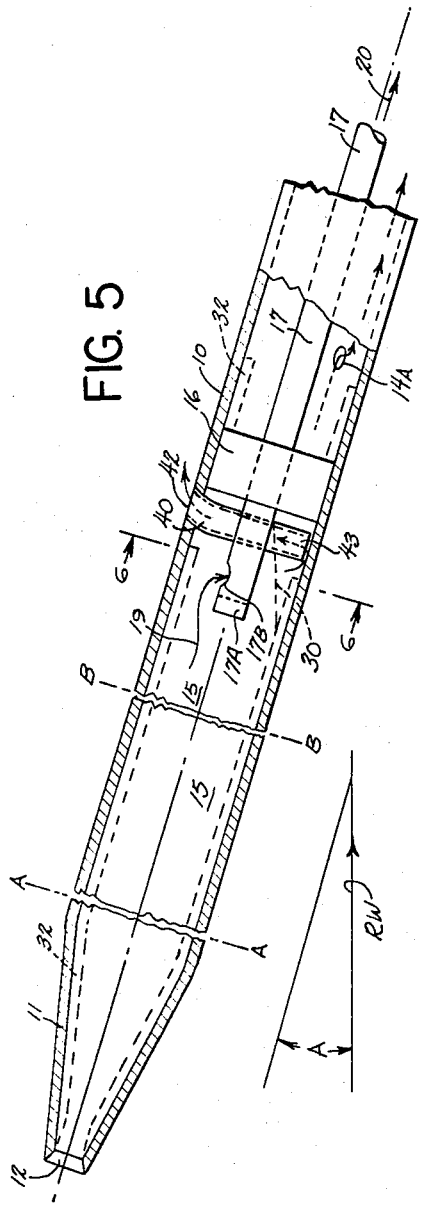
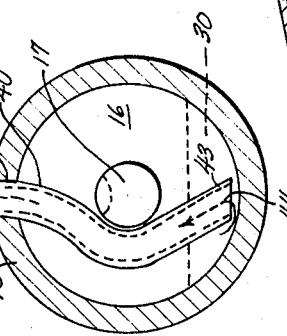
INVENTOR.
FRANK D. WERNER
BY Dugger, Braddock, Johnson & Westman
ATTORNEYS May 21, 1968 F. D. WERNER 3,383,916
PRESSURE INSTRUMENTATION DEVICE
Filed July 22, 1964 3 Sheets-Sheet 3

INVENTOR.
FRANK D. WERNER
BY
Dugger, Braddock, Johnson & Westman
ATTORNEYS

United States Patent Office 3,383,916
Patented May 21, 1968

3,383,916
PRESSURE INSTRUMENTATION DEVICE
Frank D. Werner, Minneapolis, Minn., assignor to Rosemount Engineering Company, Minneapolis, Minn., a corporation of Minnesota
Continuation-in-part of application Ser. No. 192,830, May 7, 1962. This application July 22, 1964, Ser. No. 384,443
11 Claims. (Cl. 73—212)

This application is a continuation-in-part of my application Ser. No. 192,830 filed May 7, 1962.

This invention relates to improved improvements in pitot and pitot static tubes, suitable for use on aircraft and the like vehicles. A pitot tube has a forwardly-directed opening, into which the relative wind enters and establishes a pressure, which is known as pitot-tube pressure. This pressure is used for operating instruments on the aircraft or vehicle, to which the pitot tube is attached. Every airplane also has what is known as the "static-port." In slower speed aircraft, the static port is located on some surface of the fuselage or wing of the craft, which has been found by test to exhibit a static pressure substantially equal to that pressure in the free air surrounding the vehicle. In higher speed aircraft, missiles and the like, the static port is frequently combined with the pitot-tube structure. Thus, a combined structure can be provided wherein the open front end of the tube serves as the pitot tube and the same tube is provided with ports on its outer surface at points removed from its forward end, for measuring the static pressure. Tubes of this type are described in NASA Report 18, dated June 1959.

In some pitot tubes, the tube itself projects forwardly and the pitot pressure generated by the forward open end is carried back via the tube to instruments in the airplane. In the event water or other forms of precipitation enter the tube, this is also driven back into the tube. Various expedients have been provided for eliminating water, none completely satisfactory. During icing conditions, the pitot tube must be maintained sufficiently hot to melt ice and to keep the water from refreezing. Significant and undesirably large amounts of electrical power are required for this purpose.

In combined pitot-static type which have not only the forwardly directed pitot tube opening, but also static ports on the pitot-static tube structure, the pitot and static openings are in relatively close proximity. Furthermore, this tube is arranged generally axially in respect to the aircraft and as a result of the angle of attack of the aircraft, the pitot-static tube structure is normally also at an average, small angle in respect to the relative wind which is the same or nearly the same as the angle of attack of the aircraft generally. The aforesaid NASA Report 18 describes the underside loction of the static ports of the combined pitot-static tube. During the operation of the aircraft carrying such a combined pitot-static tube, rain, super-cooled droplets of water, ice and snow may enter the pitot-tube opening and these may accumulate as moisture in the pitot tube channel and piping connected thereto. Such accumulations of discrete water will frequently cause errors in the pitot tube pressure, and if the water should be sufficient or should freeze, it completely plugs the system and thereby deprives the aircraft of the pitot-pressure reading with consequent unfavorable affects on the aircraft.

It is an object of the invention to provide improvements applicable to pitot tubes and also applicable to pitot-static tubes for overcoming the problem of water elimination without impairment of the functioning of such tubes and with significant savings in the electrical power requirements for insuring de-icing of such tubes.

It is a further object of the present invention to provide an improved combined pitot-static tube with provision for elimination of accumulated water in a location such as not adversely to affect the pressure sensing of the pitot tube portion of the system or the pressure sensing of the static port portion of the system. It is a further object of the invention to provide an improved pitot-static tube structure wherein accumulations of moisture are safely emptied in a location remote from the static port of the system and/or in a manner so that water and/or air ejected from the water elimination port will not adversely affect the accuracy of the pressure indication derived from the static port or ports.

It is another object of the invention to provide a combined pitot-static system wherein any accumulations of moisture are delivered at a heated portion of the structure which is at the same time sufficiently remote from the static port and pitot port of the structure so as not adversely to affect the accuracy of pressure reading derived at such ports.

Other and further objects are those inherent in the invention herein illustrated, described and claimed, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURE 1 is a longitudinal sectional view of an exemplary form of the invention as embodied in a pitot tube;

FIGURE 2 is an enlarged transverse sectional view, taken in the direction of arrows 2—2 of FIGURE 1;

FIGURE 3 is an enlarged fragmentary longitudinal sectional view showing an exemplary form of the invention as embodied in a combined pitot-static tube;

FIGURE 4 is a transverse sectional view taken along the line and in the direction of arrows 4—4 in FIGURE 1;

FIGURE 5 is a longitudinal sectional view of another embodiment of the invention illustrating a combined pitot-static tube;

FIGURE 6 is a transverse sectional view slightly enlarged along the line and in the direction of arrows 6—6 in FIGURE 5;

FIGURE 10 is a longitudinal sectional view of a further embodiment of the invention.

Throughout the drawings, corresponding numerals refer to the same parts.

Figure 7:
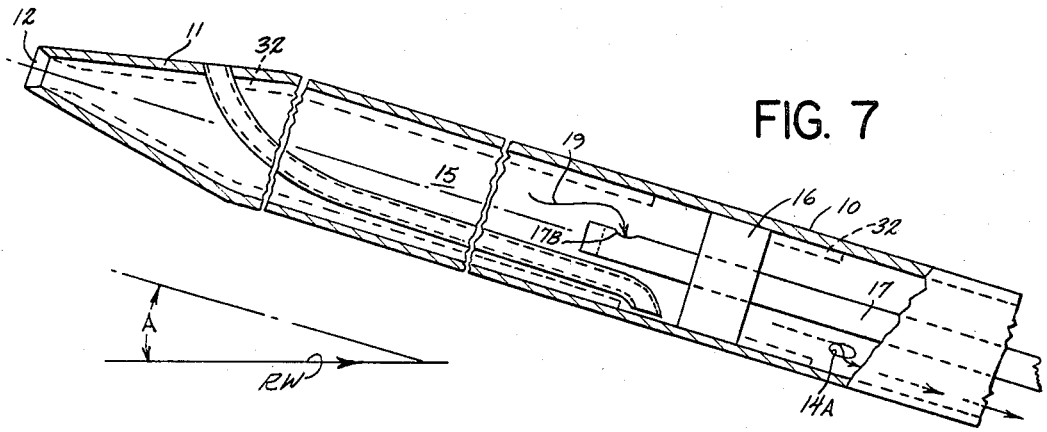
FIGURE 7 is a longitudinal sectional view of another embodiment of the invention.

Referring to the form of the invention shown in FIGURES 1 and 2, the pitot tube is composed of a tube generally designated 10 which extends a forwardly directed opening or mouth 12. This tube can be made of any configuration suitable for its intended purpose such as the configuration as shown in my co-pending applications, Ser. No. 68,085, filed Nov. 8, 1960, now Patent No. 3,120,123, and Ser. No. 164,280, filed Jan. 4, 1962, now Patent No. 3,163,040, to which reference is made.

In FIGURES 1, 5 and 7–9, the average angle of attack is angle A, and since the pitot tube is directed in the direction of the airplane it will also be at a position of angle A in respect to the relative wind. The actual angle of attack may vary considerably during operation and may sometimes even become negative, but on an average will be as illustrated. In FIGURES 1, 5 and 7–9, the angle A is shown exaggerated as compared to the actual average angle of attack experienced in practice.

According to the present invention, the pitot-tube pressure, which is generated by the in-rush of the relative wind into the open port 12 of the pitot tube provides a pressure in the space 15 within the tube which is desired to be communicated to the instruments within the aircraft. Any precipitation such as rain, melted ice or snow or the like will run back into the tube, until it re-freezes, and heat is provided to prevent this. In order to minimize the amount of the tube which must be heated, a plug 16 is provided inside of the pitot tube 10 and through this plug there is passed a smaller tube 17 the inlet to which is elevated above the bottom inner surface of tube 10 near plug 16. Tube 17 is provided with an end closure at 17A, which prevents precipitation from entering tube 17, but into the side of tube 17 there is made an aperture 17B which lets the air pressure, i.e. the "pitot tube pressure" within tube 10 near plug 16, enter tube 17. The pressure thus induced by the in-rush of air into open port 12 accordingly builds up a pressure in the space 15 and the air pressure (separated from precipitation) is applied via arrow 19 through port 17B into the interior of the tube 17 and this pressure is communicated through the tube 17 to the instruments of the aircraft, via arrow 20. It is such pressure at 20 which is the "pitot-tube pressure" use for instruments of the aircraft.

Precipitation will also flow into the open mouth 15 and will accumulate as water in the lower part 30 of the space 15, and if not removed might flow into the tube 17 via opening 17B. According to the present invention, provision is made for the outflow of accumulated precipitation and for delivering it harmlessly to an exterior location, all without requiring heating of much of tube 10, and in a manner such that the "pitot tube" pressure and "static" pressure, where derived from a "static" port on the pitot tube structure, will not be adversely affected in regard to the accuracies of such pressures.

Referring to FIGURES 2 and 3 particularly, the plug 16 is provided with a drilled hole 22 of shallow depth at its upper portion. This drill hole is very shallow and is only for the purpose of providing a starting place for smaller drill holes 24A and 24B which are drilled at an angle into the body of the plug 16. These latter holes are drilled in directions such that they miss the hole through plug 16 which is provided for tube 17. Then at the bottom of the plug 16 a small flat space 25 is provided at an angle to the axis of plug 16 and into this flat there are drilled holes 26A and 26B angularly directed so as to pass into the interior of the plug 16 and so as to intersect the holes 24A and 24B respectively. At the position of the hole 22 in plug 16, when it is assembled in tube 10, there is drilled an exit hole 27 through the wall of the tube 10, this hole being slanted rearwardly, that is to say away from port 12, of the pitot tube. The accumulated precipitation at 30 within the space 15 of the pitot tube is delivered, due to the pitot pressure within space 15. The flow is upwardly through the drill holes 26A–26B and then through the drill holes 24A–24B and the shallow drill hole 22, and thence out through the exit hole 27. The plug 16 is permanently soldered or sweated into the tubes 10 and onto tube 17 so as to be seated solidly therewith but care is taken not to use so much solder that it would stop any of the water channels just described. Therefore, plug 16 remains in place, with the shallow drill hole 22 of the passageways in registry with the exit hole 27.

Under some conditions of operation, the pitot-static tube will be at temperatures below the freezing point, and therefore, if snow, ice granules or super-cooled droplets of water enter the space 15 of the tube 10 or impinge upon the mouth 12, it is likely that, in the absence of heating, there will be accumulated at least some ice within the space 15. To obviate this icing difficulty, a portion of the tube 10 is provided with electrical heaters, which are diagrammatically illustrated at 32, and to minimize the heat demands, it is desirable, according to this invention, to position plug 16 reasonably close to the front end of tube 10. The heaters are so located as not to interfere with water sump space 30 or to interfere with the outflow of water via arrow 34. It is not necessary to heat all of the pitot tube. According to this invention, under usual conditions, heating will only be supplied around the mouth 12, and in the region of the space 30 and to and including plug 16. This insures that precipitation entering the port 12 will remain in fluid condition at least in the region of space 30 and plug 16, and for a time which is long enough so as to allow the fluid to pass through the drill holes 26A–24A–22 and out through the port 27, where the fluid precipitation will be harmlessly ejected. It is not necessary to provide much heat rearwardly of the delivery port 27, and therefore, ice may accumulate downstream from said delivery port.

Thus, according to the present invention, only the forward portion of the tube 10 is maintained heated back to and a little behind plug 16 so as to insure that precipitation remains melted and capable of being delivered out of the delivery port 27. Since plug 16 can be located quite near the front end of tube 10, especially in a pitot tube, the total heat requirements are significantly reduced, as compared to most heated pitot tubes. Thus, in FIGURE 1, the section between Line A—A and Line B—B could, if desired, be shortened or eliminated in a pitot tube, thus, in effect to bring plug 16 nearer the front end 12 of the tube 10. In a combined pitot-static tube, the plug 16 is situated rather a greater distance from front end 12, for aerodynamic reasons, thus providing a configuration as in FIGURES 1 and 5.

Many forms of heaters may be used, an exemplary form being illustrated in my co-pending application entitled "De-Iced Pitot Static Tube," filed Jan. 24, 1962, Ser. No. 164,280.

The improvements of this invention can also be used with significant advantages in combined pitot-static tubes. Combined pitot-static tubes can be constructed, from the aerodynamic standpoint, according to the aforesaid NASA Report 18. According to the teaching of said NASA Report 18, two ports should be provided and these should be on the underside of the tube, at symmetrical locations with reference to the center plane of the tube. The angles between the tube and the centerplane should be from 36–40 degrees, according to the aforesaid report. It is preferred that angles be 37.5 degrees.

Thus, a structure such as shown in FIGURE 1 may be provided with (preferably) two "static ports" 14A and 14B located on the underside of tube 10, behind plug 16 and at (preferably) equal angles B and B from centerplane 15, the angles B and B each being in the range of 36–40 degrees, preferably 37.5 degrees. The heaters 32 are preferably carried back to or a little rearwardly beyond static ports 14A and 14B to insure that water spewed out through exit hole 27 does not build up anywhere near the static ports. The heaters 32 of course are located so as not to cover ports 14A and 14B. This is shown in FIGURES 3 and 4, it being understood that the structure generally is as described for FIGURE 1. In short, the FIGURE 1 structure need only be provided with static ports 14A and 14B as shown in FIGURES 3 and 4 and the heaters 32 carried back a little, and a "pitot-static" tube results.

In FIGURE 1 thus modified, the angle of attack, i.e. angle A of the aircraft, and hence of the pitot-static tube, is as illustrated and this means that relatives wind RW strikes the underside of the pitot-static tube at an angel A, and in so doing, generates the desired static pressure measurment at hole 14A and 14B as taught by NASA Report 18. Precipitation received into the tube 12 as water or as snow or ice which is melted is eliminated at exit hole 27, all as previously described.

It will be noted that the exit hole 27 is in the vertical plane 15 and therefore, is on the "upper" side of the tube 10, and is a maximum distance away from the static ports 14A and 14B. Therefore, water delivered from the port 27 will in normal course be spewed out of hole 27 into the air stream or some may flow back along the tube 10 along its upper side, and in either event will not interfere with the flow of air in and around the ports 14A–14B, which generates the "static pressure."

It must be noted that when there is no accumulated water in space 30, that air will flow via arrows 34—34, and be spilled as a jet of air at port 27. This jet of air leaving port 27 is often significantly responsible for inaccuracies in the pressure readings derived from the pitot and static ports and especially the latter. It is a feature of this invention that the water and/or the air jet out of the "water delivery" port 27 (where ever said port is located, as herein specified) should be at a location or sufficiently remote from the pitot and static ports so as not adversely to affect the accuracy of the pressure readings derived from such ports.

In general, the outer configuration and location of plug 16 of a combined pitot-static tube will be approximately as in FIGURE 1, modified to have two static ports 14A and 14B rearwardly of plug 16, as shown in FIGURES 3 and 4, whereas when a pitot pressure only is being measured, the tube can then be shortened (by decreasing space between lines 2—2 and 4—4) with consequent reduction in electric heat input below that needed for the pitot-static tube embodiment.

In the embodiment of the invention shown in FIGURE 1, the port 27 is quite proximate static ports 14A and 14B as measured axially along tube 10, but port 27 is remotely located in respect to the periphery of tube 10, i.e. port 27 is directed upwardly whereas ports 14A and 14B are directed downwardly. Hence the jet from port 27 does not adversely affect the reading derived from static ports 14A and 14B.

Referring now to FIGURES 5 and 6, these figures are in all respects the same as that shown in FIGURES 1–4 except for the following particulars: In FIGURES 1–4, the plug 16 was provided with water delivery passageways 26A–24A and 26B–24B connecting with port 22, and a delivery orifice 27. In FIGURE 5, the plug 16 is made solid, except for the aperture through which the tube 17 passes. Then, slightly forward of the plug 16, there is provided a tube 40 which is fastened into the pitot-static tube 10 at the location 41 to provide a delivery port 42. Within the tube 10, tube 40 is bent as shown in FIGURE 6, so as to avoid the contiguous portion of the tube 17, and tube 40 then extends down to an open end at 43, which is very close to the inside wall of the tube 10, at the bottom of the water collection space 30. Therefore, the water in space 30 flows via arrows 44 from the space 30 upwardly through the tube 40 to its upper end which forms exit port 42, where it is delivered on the exterior surface of the tube 10 (and when there is no water, then the flow will be air). The delivery of the precipitation and/or air at such port 42 insures that the outflow of precipitation and any ice that might be built up downstream therefrom will be so remotely located that the "pitot pressure" reading derived from port 12 and the "static pressure" reading derived from ports 14A and 14B will not be adversely affected in so far as accuracy is concerned. Here again the port 42 is remote in the sense that port 42 is widely spaced axially along tube 10 from the pitot port 12 and port 42 is directed upwardly while ports 14A and 14B are directed downwardly.

Figure 8:
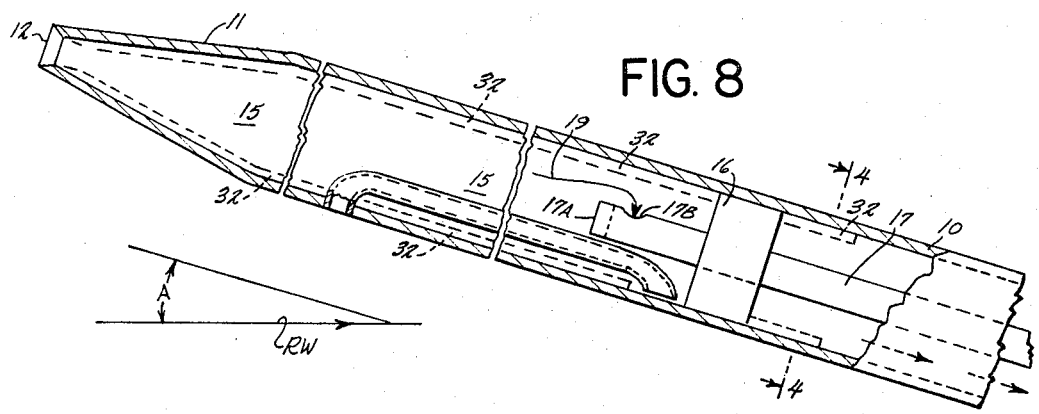
FIGURE 8 is a longitudinal sectional view of a further embodiment of the invention.
Figure 9:
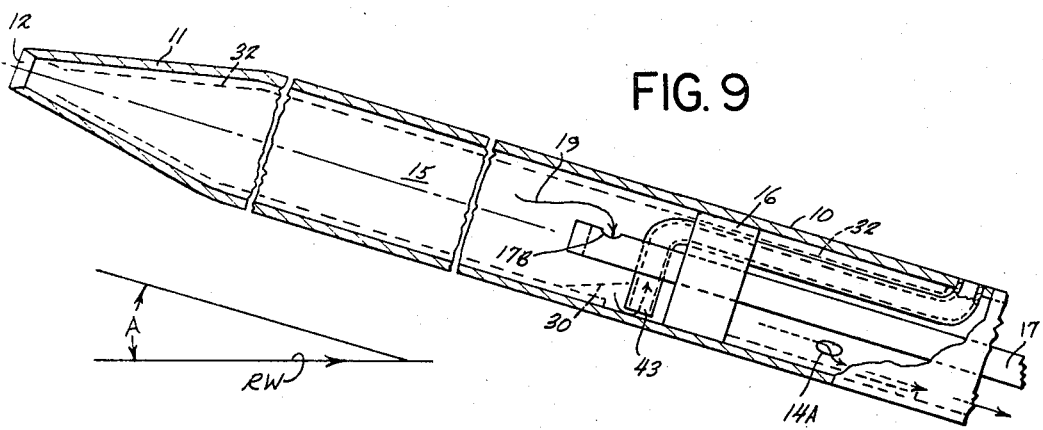
FIGURE 9 is a longitudinal sectional view of another embodiment form of the invention.

FIGURES 7, 8 and 9 show three further embodiments of the present invention, wherein the water delivery port is made remote by being positioned axially displaced along tube 10 from the pitot and static ports. In FIGURE 7, the water (and air) delivery passageway (corresponding to tube 40 in FIGURES 5 and 6) is run forwardly within the pitot tube body to an exit port 45 on the forward upper part of tube 10. In FIGURE 9 the water delivery passageway is run rearwardly to an exit port 47 on the rear upper part of tube 10. In FIGURE 8 the water delivery passageway is run forwardly to an exit port 46 on the forward lower part of tube 10.

In each of these embodiments (FIGURES 7, 8 and 9) the exit ports 45, 46 or 47 is displaced from the pitot 12 and static ports 14A and 14B sufficiently that the blast of water and/or air issuing therefrom will not adversely affect the "pitot" and "static" pressures derived respectively. Ports 12 and 14A–14B are therefore not adversely affected in respect to accuracy. By having the water passageway exit axially displaced sufficiently forwardly in respect to the position of the static port 14A as in FIGURES 7 and 8, the jet blast of water and/or air will not affect the pressure readings derived from such static ports or pitot ports. Also, if the water passageway exit is displaced sufficiently forwardly of the static port then, even though port 46 is on the bottom of tube 10, as in FIGURE 8, water and/or air delivered out of the port 46 will not disturb the airflow and render inaccurate pressure readings from the static ports 14A and 14B. Likewise when the exit port 47 is displaced axially rearwardly from the static ports 14A and 14B, as in FIGURE 9, the readings taken at the static ports are not adversely affected.

It has been found that even though the exit port is located on the same side of tube 10 as the static ports 14A and 14B (as is port 46 in FIGURE 8) the airflow through the water passageway and out of the port 46 will not disturb the reading at the static port 14A and 14B, provided the exit port is located forwardly of the static port by the distance of at least 10 times the diameter of a circle that encloses the area of such exit port 46 and this is equally true in respect to the amount of such axial displacement of the water and/or air exit ports 45, 47 in respect to the static ports in the embodiments of FIGURES 7 and 9. Thus, pursuant this invention, the displacement of the water and/or air exit port axially along tube 10 from the static ports 14A and 14B is made equal to ten times the diameter of the exit port. When the exit port is other than circular, the displacement is based upon the diameter of a circle just large enough to enclose such non-circular static port.

In FIGURE 10 there is illustrated a further embodiment of the invention similar to that shown in FIGURE 8 except that the water delivery channel is carried from space 30, through plug 16 to a water and/or exit port 48 which is located rearwardly of the static ports 14A and 14B by an amount equaling ten diameters of the exit port 48.

In any of the embodiments of the invention, the "static ports" 14A and 14B are used only when a "static pressure" indication is desired. They may be eliminated when only a pitot pressure is desired, and in such event cause the length of the tube between the portions of lines A—A and B—B (see FIGURE 5) can be decreased or eliminated. In any event when static ports 14A and 14B are used, the elimination of water is at a location sufficiently remote so as not to produce any aberration or error in the static-pressure reading indication.

The word "remote," as used with reference to the location of the water and/or exit port in this specification and in the claims is intended to mean a condition of "remoteness" occurring by virtue of axial displacement of such exit port from the static ports 14A and 14B as illustrated in the embodiments shown in FIGURES 7, 8 and 9, and/or the condition of "remoteness" attained by location of such exit port on what is generally the opposite side of the tube structure 10 as illustrated in the embodiments shown in FIGURES 1–7 and FIGURE 9. Both factors (i.e. axial displacement and opposite-side location) do contribute to the condition of "remoteness" of the exit port. The purpose on having the exit port remote from the static port is to isolate the static port from air disturbance caused by air escaping from the exit port. Thus, when the exit port is located on the opposite side of tube 10 from the static ports as in FIGURES 1–6, the axial displacement factor may be eliminated. When the exit port is located on the same side as, and directly in front of, the static port as shown in FIGURE 8 the axial displacement required is a maximum value. Tests have shown that with the latter arrangement, the exit port must be forward of the static port a distance of at least 10 times the diameter of a circle with a cross sectional area equal to the smallest cross sectional area of the water delivery passageway.

As many apparently widely different embodiments of this invention may be made without departing from the spirit and scope thereof, it is to be understood that I do not limit myself to the specific embodiments disclosed herein.

What I claim is:

1. A pressure instrumentation device for an aircraft missile or the like, having an average normal attitude forming a slight angle with reference to the relative wind through which it travels comprising an elongated tube having a lower surface against which the relative wind impinges at said slight angle and an upper surface and a forwardly directed open end forming a pitot tube port into said tube, a plug in the tube sealing off a forward space thereof adjacent the pitot tube opening, a pitot pressure line extending through the tube and through said plug and into said forward space, said line terminating at a port which is within said forward space and elevated above the floor thereof, and a water delivery channel extending from an entrance mouth within said forward space adjacent the floor of said space near said plug, said channel extending upwardly and terminating at a water delivery port on a portion of the tube which is remote from said lower surface.

2. A pressure instrumentation device for an aircraft missile or the like, having an average normal attitude forming a slight angle with reference to the relative wind through which it travels comprising an elongated tube having a lower surface against which the relative wind impinges at said slight angle and an upper surface and a forwardly directed open end forming a pitot tube port into said tube, a transverse sealing wall in the tube sealing off a forward space thereof adjacent the pitot tube opening, a pitot pressure line extending through the tube and through said transverse sealing wall and into said forward space, said line terminating at a port which is within said forward space and elevated above the floor thereof, a static pressure port through the wall of the tube at a position rearwardly from said sealing wall, a water delivery channel extending from an entrance mouth within said forward space adjacent the floor of said space near said transverse sealing wall, said channel extending upwardly and terminating at a water delivery port at an exterior surface of the tube other than that portion of the lower surface which is forward of and adjacent said static pressure port, and electric heater means on the tube for maintaining water in said tube in a liquid condition from the forwardly directed opening to and including said water delivery port.

3. A pressure instrumentation device comprising an elongated tube having a forwardly directed open end forming a pitot tube port into said tube, a plug in the tube sealing off a forward space thereof adjacent the pitot tube opening, a pitot pressure line extending through the tube and through said plug and into said forward space, said line terminating at a port which is elevated above the floor of said forward space, a static port through the wall of the elongated tube at a position rearwardly from the plug in said tube, said static port being downwardly directed in respect to the normal position of the elongated tube, and a water delivery channel extending from an entrance mouth within said forward space adjacent the floor of said space near said plug, said channel extending upwardly and terminating at a water delivery port on the exterior top part of said elongated tube and remote from said static port.

4. The pitot-static tube specified in claim 3 further characterized in that a pair of static ports are provided, each directed downwardly at approximately 36°–40° to the vertical center plane through said tube.

5. The pitot-static tube specified in claim 3 further characterized in that said channels are within said plug.

6. The pitot-static tube specified in claim 1 further characterized in that said channel is composed of a small tube within and connected to the elongated tube and located proximate but ahead of said transverse sealing wall.

7. The pitot-static tube specified in claim 3 further characterized in that said tube and heater means is provided for maintaining at least portions of said elongated tube at said pitot tube port and said water delivery channel at temperatures above freezing temperature.

8. The pitot-static tube specified in claim 1 further characterized in that heater means on said elongated tube for maintaining that portion of the tube extending from the pitot-tube port to vicinity of the static port at a temperature above freezing temperature.

9. A pitot-static tube for aircraft, missiles or the like, having an average normal attitude forming a slight angle with reference to the relative wind through which it travels, comprising an elongated tube against which the relative wind impinges at said slight angle and a forwardly directed open end forming a pitot tube port into said tube, a plug in the tube sealing off the forward space thereof adjacent the pitot tube port, a pitot pressure line extending through the tube and through said plug and into said forward space, said line terminating at a port within said forward space and elevated above the floor thereof, an opening in the wall of said tube located to the rear of said plug and forming a static pressure opening, and a water delivery channel extending from an entrance mouth within said forward space adjacent the floor of said space near said plug forwardly to a water delivery exit port on the forward upper part of the tube remote from said static pressure opening.

10. A pitot-static tube for aircraft, missiles or the like, having an average normal attitude forming a slight angle with reference to the relative wind through which it travels, comprising an elongated tube against which the relative wind impinges at said slight angle and a forwardly directed open end forming a pitot tube port into said tube, a plug in the tube sealing off the forward space thereof adjacent the pitot tube port, a pitot pressure line extending through the tube and through said plug and into said forward space, said line terminating at a port within said forward space and elevated above the floor thereof, an opening in the wall of said tube located to the rear of said plug and forming a static pressure opening, and a water delivery channel extending from an entrance mouth within said forward space adjacent the floor of said space near said plug rearwardly to a water delivery exit port on the rear upper part of the tube remote from said static pressure opening.

11. A pitot-static tube for aircraft, missiles or the like, having an average normal attitude forming a slight angle with reference to the relative wind through which it travels, comprising an elongated tube against which the relative wind impinges at said slight angle and a forwardly directed open end forming a pitot tube port into said tube, a plug in the tube sealing off the forward space thereof adjacent the pitot tube port, a pitot pressure line extending through the tube and through said plug and into said forward space, said line terminating at a port within said forward space and elevated above the floor thereof, an opening in the wall of said tube located to the rear of said plug and forming a static pressure opening, and a water delivery channel extending from an entrance mouth within said forward space adjacent the floor of said space near said plug rearwardly to a water delivery exit port on the rear lower part of the tube rearwardly and remote from said static pressure opening.

References Cited

UNITED STATES PATENTS 2,204,367   6/1940   Kollsman _____ 73—212
2,300,654   11/1942  Daiber _____ 73—212

RICHARD C. QUEISSER, *Primary Examiner.*

EDWARD D. GILHOOLY, *Assistant Examiner.*

UNITED STATES PATENT OFFICE
CERTIFICATE OF CORRECTION

Patent No. 3,383,916 May 21, 1968

Frank D. Werner

It is certified that error appears in the above identified patent and that said Letters Patent are hereby corrected as shown below:

Column 2, line 62, after ""extends" insert -- forwardly and is reduced in size at 11 and terminates in --. Column 3, line 29, "use" should read -- used --. Column 4, line 71, "relatives" should read -- relative --. Column 7, line 3, "on" should read -- in --.

Signed and seald this 7th day of October 1969.

(SEAL)
Attest:

Edward M. Fletcher, Jr.  WILLIAM E. SCHUYLER, JR.
Attesting Officer  Commissioner of Patents